April 27, 1937.    M. B. KENDIS    2,078,386
GLASS CUTTING MECHANISM
Filed Nov. 29, 1935    3 Sheets-Sheet 1
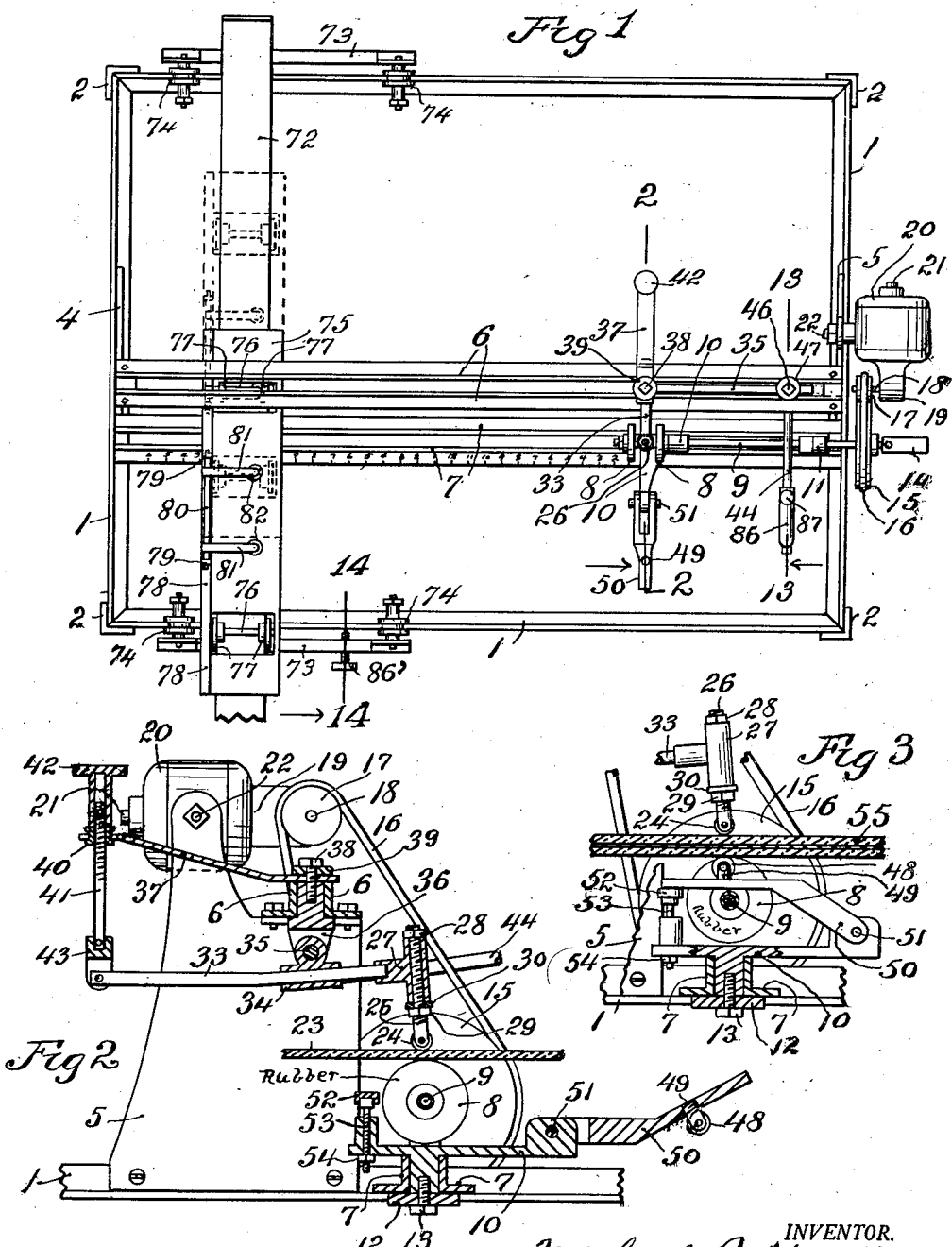
INVENTOR.
Michael B. Kendis
BY Warren D. House
His ATTORNEY April 27, 1937.   M. B. KENDIS   2,078,386
GLASS CUTTING MECHANISM
Filed Nov. 29, 1935   3 Sheets-Sheet 2
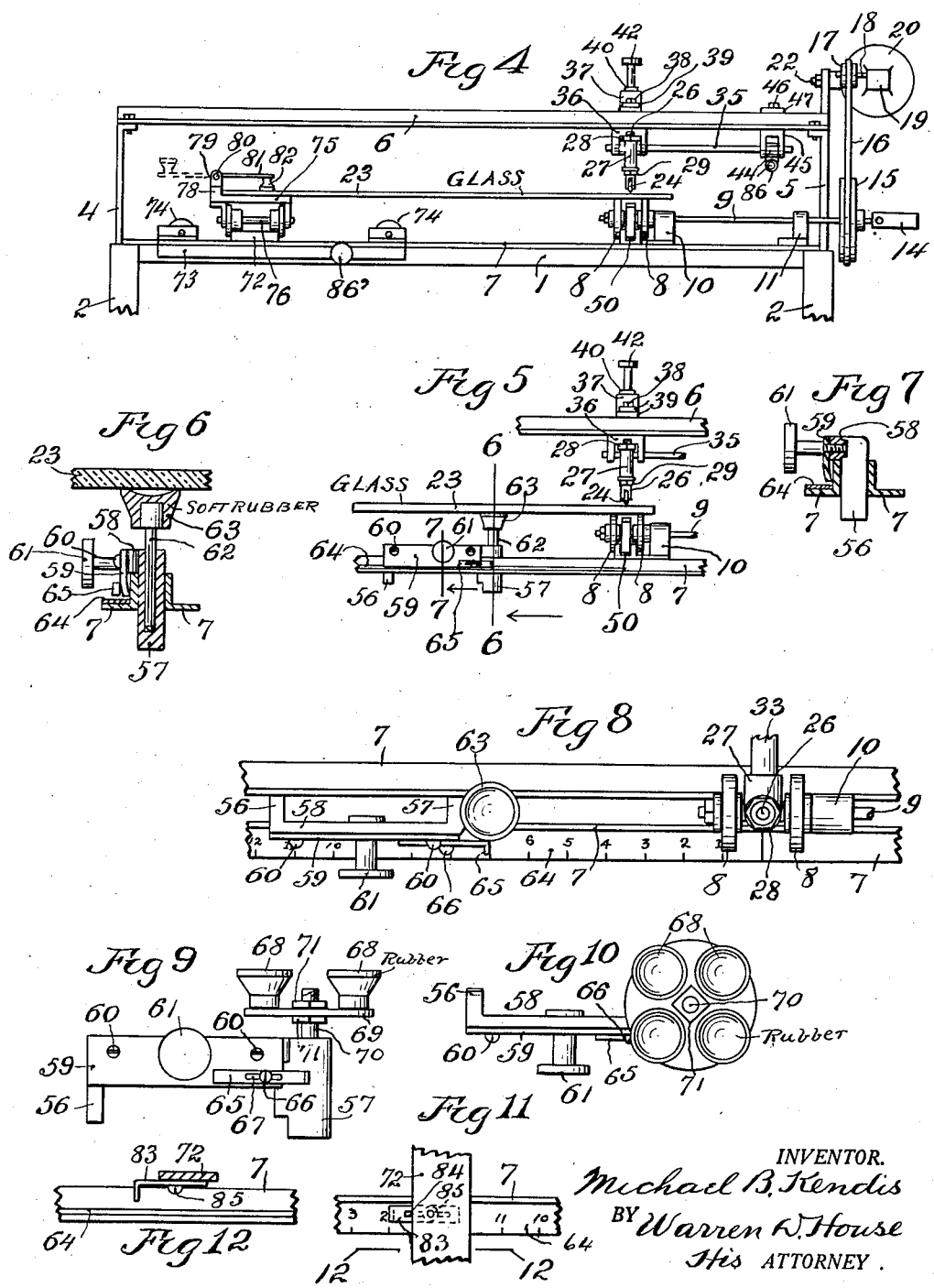
INVENTOR.
Michael B. Kendis
BY Warren W. House
His ATTORNEY.

April 27, 1937.   M. B. KENDIS   2,078,386
GLASS CUTTING MECHANISM
Filed Nov. 29, 1935   3 Sheets-Sheet 3
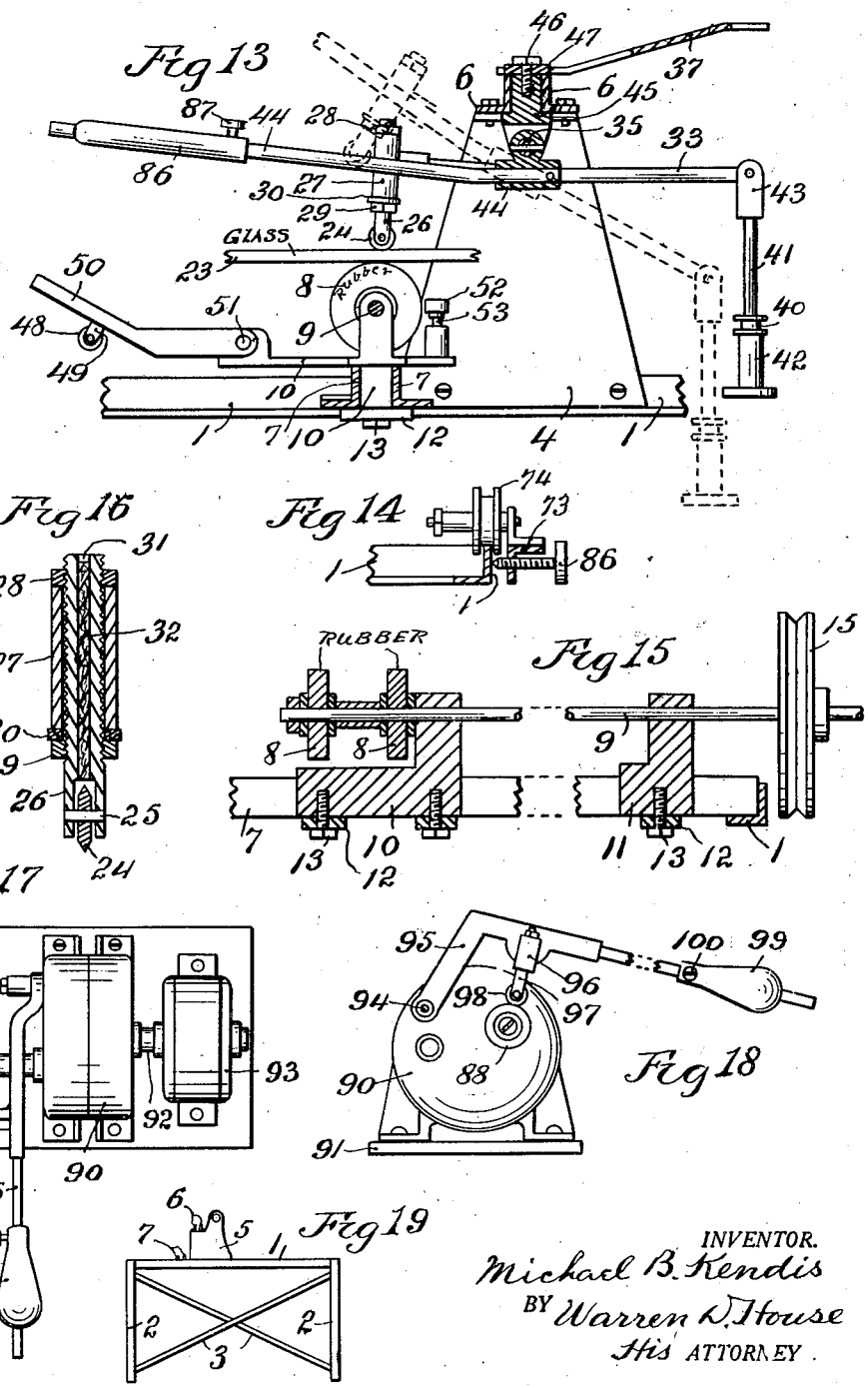
INVENTOR.
Michael B. Kendis
BY Warren D. House
His ATTORNEY.

Patented Apr. 27, 1937

2,078,386

UNITED STATES PATENT OFFICE 2,078,386

GLASS CUTTING MECHANISM

Michael B. Kendis, Sedalia, Mo.

Application November 29, 1935, Serial No. 52,104

9 Claims. (Cl. 33—32)

My invention relates to improvements in Glass cutting mechanisms. It is in part a continuation of an application having Serial Number 22,216, filed by me May 18, 1935.

One of the objects of my invention is the provision of a novel mechanism by which a plate of glass is simultaneously cut along two parallel oppositely disposed lines on opposite sides respectively of the plate, whereby it is adapted for use in the cutting of what is commonly termed "safety" or "shatter-proof" glass, that is composed of two plates attached respectively to opposite sides of a sheet, such as celluloid or other suitable material.

My invention provides further a novel mechanism by which a plate of glass can be rapidly easily and accurately cut along straight, curved or angular lines, which is simple, strong, durable, not likely to get out of order, which is adapted to cut plates of glass largely differing in area and thickness, which has novel means for adjustment to suit it for cutting glass of different hardness and under different pressures, which provides novel means for forwardly feeding a plate of glass as it is being cut, and which is efficient in its operation.

The novel features of my invention are hereinafter fully described and claimed.

In the accompanying drawings which illustrate my invention,

Fig. 1 is a plan view of one form of my invention, partly broken away and parts removed.

Fig. 2 is an enlarged section on the line 2—2 of Fig. 1.

Fig. 3 is an enlarged section in the plane of the line 2—2 of Fig. 1, parts being broken away, showing both cutters operating upon opposite sides respectively of a plate of "safety" glass.

Fig. 4 is a front elevation of the machine shown in Fig. 1, the legs being shown partly broken away and parts removed, and showing a large plate of glass mounted on the carriage in operative position and with the upper cutter in contact therewith.

Fig. 5 is a front elevation of part of the machine shown in Fig. 1, showing a piece of glass being operatively engaged by the upper cutter and supported by the slidably adjustable support having the single vacuum cup.

Fig. 6 is an enlarged section on the line 6—6 of Fig. 5.

Fig. 7 is an enlarged section on the line 7—7 of Fig. 5.

Fig. 8 is a top view, enlarged, of some of the parts shown in Fig. 5.

Fig. 9 is a front elevation, enlarged, of the slidably adjustable support provided with the plurality of vacuum cups.

Fig. 10 is a plan view of what is shown in Fig. 9.

Fig. 11 is an enlarged top view of a portion of the track plate which forms part of the carriage and has attached to it a measuring indicator which cooperates with the graduated measuring scale, a part of which is shown, mounted on one of the intermediate beams at the top of the frame of the machine shown in Figs. 1, 4 and 8.

Fig. 12 is a section on the line 12—12 of Fig. 11.

Fig. 13 is an enlarged section on the plane of the line 13—13 of Fig. 1, showing a piece of glass being cut by the upper cutter, the latter being operated by the crank handle, the adjusting mechanism for the cutter being shown detached from its supporting leaf spring.

Fig. 14 is a section on the line 14—14 of Fig. 1.

Fig. 15 is an enlarged longitudinal elevation of the driving shaft shown mounted in its bearings which are shown in vertical section as are the glass supporting wheels mounted on the shaft, the latter being partly broken away.

Fig. 16 is an enlarged longitudinal central sectional view of the upper glass cutter and part of its supporting means.

Fig. 17 is a plan view of a modification of my invention which is adapted for cutting or trimming lenses or other relatively small pieces of glass.

Fig. 18 is an end elevation of the machine shown in Fig. 17.

Fig. 19 is a reduced end elevation of the frame of the machine which is shown in Figs. 1 to 16 inclusive, the operating parts being removed.

Similar characters of reference designate similar parts in the different views.

The machine, parts of which are shown in Figs. 1 to 16 and in Fig. 18, is provided with a supporting structure comprising a horizontal rectangular top border frame 1, which is supported at its corners by legs 2, which, as is shown in Fig. 18 may be braced by cross braces 3 between adjacent legs.

Two vertical plates 4 and 5 are respectively supported at their lower ends upon opposite ends of the frame 1. Two longitudinal horizontal parallel angle bars 6, which are spaced a short distance apart, have their opposite ends respectively fastened to the upper edges of the plates 4 and 5, Figs. 1 and 4.

Parallel with and below and a short distance forward of the angle bars 6 are angle bars 7 opposite ends of which are fastened to the upper sides of the opposite ends of the frame 1, Figs. 1 and 4.

For supporting, and when so desired, for feeding plates of glass to be cut, there are provided two spaced apart wheels 8 of soft rubber on and rotatable by and with a driving shaft 9.

The driving shaft 9 is rotatable in two bearings 10 and 11, Figs. 4, 13 and 15, longitudinally adjustable between the angle bars 7 and clamped thereto by plates 12 held by bolts 13 to the under sides of the bars 7.

The shaft 9 may be rotated by hand, if desired, by a removable handle 14, at the outer end of the shaft, or by a pulley 15 fastened to the shaft 9 and driven by a belt 16 engaging a pulley 17 fastened to a shaft 18, which forms part of a transmission in the housing 19 of a motor 20, the armature shaft 21 which is a part of the transmission, which may be of any usual type. The motor housing 19 is fastened by a bolt 22 to the outer side of the plate 5, Figs. 1, 2 and 4.

The shaft 9 is in a cutting operation rotated counterclockwise, as viewed in Figs. 2 and 3, and clockwise, as viewed in Fig. 13, thereby revolving the glass supporting wheels 8 in a like direction, so as to feed a glass plate 23, mounted on the wheels, rearwardly.

For cutting the upper side of the glass plate 23, there is provided an upper glass cutter, which may be a diamond, or a hardened wheel of the type usually employed for cutting glass, and which is shown in the drawings and designated by 24. The cutter 24 is rotatably mounted, Figs. 2 and 16, on a transverse pin 25 in the bifurcated lower end of a screw 26, which extends through and is longitudinally adjustable in a T shaped member 27. A nut 28 on the screw 26 bears on the upper end of the member 27. A nut 29 on the screw 26 bears against a soft rubber collar 30 on the screw 26 and bearing against the under end of the member 27.

As shown in Fig. 16, the screw 26 has a central longitudinal hole 31 therethrough in which is fitted a wick 32, which will carry oil placed in the upper end of the screw downwardly and permit the oil to drop onto and lubricate the cutter 24 and increase its efficiency.

The member 27 is fastened upon the front end of a rearwardly extending bar 33 supported in a bearing 34 which is pivoted by a bar 35 to a member 36 mounted between the bars 6, Fig. 2.

A rearwardly extending leaf spring 37 has its front portion bearing on top of the bars 6, and it has extending through it a bolt 38 which engages the member 36 and holds it against the lower sides of the bars 6. The bolt 38 extends through a collar 39 resting on the leaf spring 37 and held thereon by the head of the bolt.

The rear end of the leaf spring 37 is bifurcated and has removably fitted in it the middle annularly grooved portion of a spool 40 slidable and revoluble on a threaded end portion of a rod 41 which is adjustably fitted in the internally threaded end of an adjusting tubular member 42, to which end said spool 40 is attached.

The other end of the rod 41 is fastened to a member 43 pivoted on a horizontal axis to the rear end of the bar 33, Fig. 2.

By adjusting the tubular adjusting member 42 up and down on the rod 41, when the spool 40 is engaged with the leaf spring 37, the front end of the bar 33 may be vertically adjusted, so as to move the member 27 and the cutter 24 carried thereby upwardly or downwardly, to vary the pressure of the cutter on the plate 23 of glass which is being cut.

When it is desired to raise and lower the cutter 24 by hand, it is effected by means of a crank handle 44 attached at its rear end to the bar 35 and extending forwardly therefrom, Figs. 1, 4 and 13.

As shown in Fig. 13, the handle 44 is disposed between the arms of the bifurcated lower end of a bearing 45 in which the bar 35 is pivoted, and which is between the bars 6 to which the bearing 45 is held by a bolt 46 the head of which bears on a collar 47 on top of the bars 6 against the bottoms of which the bearing 45 bears.

When it is desired to swing the glass cutter 24 upwardly and downwardly, or hold it against the glass to be cut, by hand, the tubular adjusting member 42 is forced rearwardly so as to disengage the spool 40 from the leaf spring 37. The member 42, and with it the spool 40 and rod 41 are then permitted to swing to the depending freed position, shown in Fig. 13 in solid lines.

The bar 33 carrying with it the cutter 24 may then be swung by the handle 44 and bar 35, as desired. When so used, the handle 14 may be used to revolve the shaft 9 and to revolve the wheels or cylinders 8, on throwing the belt 16 off from the pulley 15.

The weight of the handle 44 may be such as to exert the desired pressure of the cutter 24 on the glass plate that is being cut. By turning the shaft 9 by hand, as described and using the handle 44 to operate the cutter, small pieces of glass, such as lenses may be trimmed or cut to shape and size desired.

To cut the glass with power, the plate 23 to be cut is disposed on the cylinders or wheels 8, the spool 40 is engaged with the leaf spring 37, as shown in Fig. 2, and the tubular member 42 is adjusted so as to have the cutter 24 bear on the glass plate 23 with proper pressure for the kind of glass which is to be cut.

The electric motor 20 is then operated to revolve the shaft 9 and wheels 8 counterclockwise, as viewed in Fig. 2, thereby feeding the glass plate rearwardly in contact with the cutter 24, which cuts the plate, after which it is broken apart in the usual manner.

To enable a plate of glass 23, or a plate of "safety" or "shatter-proof" glass to be simultaneously cut upon opposite sides, there is provided a diamond, or as shown a hardened metal glass cutter wheel 48, which is rotatably mounted in the bifurcated end of a screw 49, Fig. 3, and Figs. 1, 2 and 13, which is mounted on a bar 50 pivoted on a horizontal pin 51 in the bearing 10.

The bar 50 is so pivoted to the bearing 10, as to be swung from the inoperative position, shown in Figs. 1, 2 and 13 to the operative position, shown in Fig. 3, in which position the cutter 48 is disposed in substantially the same vertical plane as the cutter 24, below the latter.

The rear end of the bar 50 in its operative position, shown in Fig. 3 rests on a rubber cap 52, mounted on the upper end of a vertical screw 53, Fig. 2, which is fitted adjustably in a vertical threaded hole extending through the bearing 10 at the rear of the driving shaft 9. By turning the screw 53, it may be raised and lowered to vertically adjust the soft rubber cap 52 to the position desired for supporting the rear end portion of the bar 50. A lock nut 54 on the screw 53 bears against the under side of the bearing 10, to hold the screw 53 in its adjusted position.

With the parts disposed as shown in Fig. 3, the plate of "safety" or "shatter-proof" glass 55 is passed rearwardly between the cutters 24 and 48, which cutters are adjusted so as to bear with the proper pressure against the upper and lower sides respectively of the glass plate 55. The wheels 8 are then revolved by means of the driving shaft 9 so as to feed the plate of glass 55 rearwardly, thereby causing two cuts to be simultaneously made in the same vertical plane in the upper and lower sides respectively of the glass plate.

The plate glass 55, so cut, can be readily broken apart similarly to the breaking after cutting of the single ply glass plate.

The soft rubber cap 52 on the screw 53 provides a resilient support for the bar 50 carrying the lower cutter 48. The collar 30 serves a similar purpose with respect to the screw 26 which carries the upper glass cutter 24, whereby the cutters are applied to the glass plate with a resilient yielding pressure.

For supporting small plates of glass so that they may be rotated while being cut with the cutter 24, there is provided, as shown in Figs. 5 to 10 inclusive, a carrier consisting of an inverted U shaped member the arms of which, 56 and 57 are horizontally slidable between the angle bars 7, the transverse part 58 of said member being slidable on the upper edge of the front angle bar 7. A side plate 59 is loosely supported edge up in front of the part 58 by screws 60. A clamping screw 61 rotatable in the plate 59 is fitted in a threaded hole in the part 58, and is adapted, when turned properly to force the plate 59 tightly against the part 58 and against the front side of the front angle bar 7, thus holding the carrier in the position to which it may be adjusted toward and from the cutter 24, Figs. 6 and 7.

Downwardly extending into the arm 57 is a hole in which is rotatably fitted a vertical pin 62, Figs. 5 and 6, upon the upper end of which is fitted a soft rubber cup 63 upon which is adapted to rest and to be held by suction the plate of glass 23 which is to rest on the wheels 8 while being cut with the cutter 24.

Resting on the horizontal flange of the front angle bar 7 to which it is secured is a scale plate 64 graduated in units of length. This scale plate is disposed between the cutter 24 and the plate 4.

An indicator plate 65 is horizontally adjustable on the front side of the clamping plate 59 to which it is fastened by a clamping screw 66 extending through a horizontal slot 67 in the indicator plate 65. The latter is disposed above and adjacent to the scale plate 64 with which it co-operates to designate the distance between the parallel vertical planes of the cutter 24 and the axis of the supporting pin 62, thus indicating the radius of the circle which the cutter 24 will cut on the plate 23.

In operation the piece of glass 23 to be circularly cut is pressed downwardly upon the suction cup 63, thus making the glass adhere to the cup. The carrier supporting the cup 63 is then adjusted relatively to the cutter 24 to the proper radial position and with the glass plate resting on the wheels 8. The shaft 9 is then revolved by means of the mechanism already described with the cutter 24 pressing the glass plate 23 against the wheels 8 which revolve the glass plate 23 with the cup 63 and the pin 62, whereby the cutter 24 cuts the glass plate circularly.

In Figs. 9 and 10 is shown a modification in which the glass plate is supported by four soft rubber vacuum cups 68 mounted upon a horizontal plate 69 through which extends concentrically a pin 70 which is removably rotatable in the arm 57 of the carrier, shown in Figs. 5 to 10. The upper end of the pin 70 is threaded and has thereon two nuts 71 which respectively embrace the upper and lower sides of the plate 69 and fasten the plate to the pin. The operation of this form corresponds to the operation of the form shown in Figs. 5 to 8.

For supporting relatively large plates of glass which are to rest on the wheels 8 and are to be cut by the cutter 24, there is provided, as shown in Figs. 1, 4, 11, 12, and 14, a car comprising a horizontal transverse plate 72 opposite ends of which are supported on trucks 73 provided with peripherally grooved wheels, a pair for each truck, said pairs resting and being adapted for travel respectively upon the upper edges of the front and rear angle bars forming part of the frame 1, at the left of the cutter 24, as viewed in Figs. 1 and 4.

Another car having a horizontal platform 75 parallel with and above the plate 72, is provided with two axles 76 which support the platform 75 and are each supported in turn by two flanged wheels 77 which are supported by and adapted for travel on the plate 72. The flanges of the wheels 77 engage opposite longitudinal edges of the plate 72 which thus serves as a supporting guide of the upper car.

A plate of glass 23 to be supported by the upper car, just described, is placed upon the wheels 8 and the platform 75, and has its transverse edge which is at the left of the wheels 8, as viewed in Figs. 1 and 4, disposed against a longitudinal flange 78 which extends upwardly from the left edge of the platform 75.

Upwardly extending from the flange 78 are two ears 79 in which is oscillatively mounted a pin 80 from which extend two parallel rigid arms 81, Figs. 1 and 4, which are adapted to be swung, from the position shown in dotted lines in Fig. 4 to the position shown in Fig. 1, and in solid lines in Fig. 4, in which last named position, the arms will extend horizontally over the glass plate 23. Two soft rubber vacuum cups 82, similar to the cups 63 and 68, are fastened to like sides of the arms 81, which are the under sides when the arms are disposed over the glass plate 23, and are pressed downwardly onto the glass plate to dispel the air from the cups, after which they will adhere to the glass plate and will hold the latter from shifting edgewise.

Longitudinally adjustably fastened to the under side of the plate 72 at the under side thereof, and transversely thereto above the graduated scale plate 64, is an indicator plate 83, Figs. 11 and 12, which has a longitudinal slot 84 through which extends a clamping screw 85 fitted in a vertical threaded hole in the plate 72. After the indicator plate is longitudinally adjusted, the screw 85 is tightened to clamp the plate in its adjusted position.

The left end of the indicator plate 83, Figs. 11 and 12, is disposed in the plane of the edge of the flange 78 against which the glass plate 23 abuts. The lower car which carries the car having the platform 75 is adjusted on its rails comprising the angle bars 1, front and rear, to a position in which the indicator plate 83 will indicate on the scale plate 64, the width the glass plate is to be cut by the cutter 24, after which the lower car is held in its adjusted position by means of a clamping screw 86', Figs. 1, 4 and 14.

This screw is fitted in a threaded hole extending through the vertical flange of the angle plate 73 constituting the body of the front truck which supports the plate 72 at the forward part of the latter, and which in turn is supported by the front wheels 74. The screw 86' is turned so that its rear end bears tightly against the front side of the front angle bar 1 of the top frame, thus holding the lower car in its adjusted position.

The cutter 24 is then adjusted to rest on the top of the glass plate 23 against which it may be firmly held by means of the bar 33 and connections thereto already described, actuated by the hand lever 44 and shaft 35, or by the spring 37, rod 41 and connecting parts, as has been described. The upper car carrying the glass plate is forced rearwardly on the plate 72 of the lower car, which causes the cutter 24 to crease the glass plate transverse, after which the glass plate is removed and the glass plate is then broken apart along the crease in the usual manner.

If desired the cutter 48 may be employed, simultaneously with the cutter 24, to crease the glass plate 23 on its under side, in the manner already described, or it may be left in the inactive position shown in Fig. 2.

The members 26, 27, 33 and 34 being fastened rigidly together form a crank arm or lateral extension of the oscillatable bar or shaft 35. In like manner the member 45 and handle 44 being fastened rigidly together and to the oscillatable member 35 form a lateral extension or crank arm of the member 35.

When it is desired to employ the handle 44 to swing the oscillatable bar 35, the adjusting member 42 may be swung to the left, as viewed in Fig. 2, so as to detach the spool 40 from the arms of the bifurcated rear end of the spring 37, following which the members 40, 41, 42 and 43 may be swung to the depending position shown in solid lines in Fig. 13.

When the handle 44 is employed to force the cutter 24 against a plate of glass which is being cut, and it is desired to have the operator employ both hands to guide the glass plate or lens during the cutting thereof, a tubular weight 86 is provided which is longitudinally adjustable on the handle 44 to positions thereon which will adapt the pressure downwardly exerted on the cutter 24 to suit the kind of glass which is being cut. To hold the weight 86 in the position to which it is adjusted, it has fitted in one side a set screw 87 that may be turned to bear tightly against the handle 44, Figs. 1 and 13.

If desired, the weight 86 and the spring 37 may be employed at the same time for turning the oscillatable bar or shaft 35 so as to press the cutter 24 against the plate of glass to be cut. In such case the weight 86 may be adjusted on the handle 44, and the adjusting member 42 so turned as to bring the proper pressure to bear upon the cutter 24.

In the form of my invention shown in Figs. 17 and 18, which is embodied in a relatively small portable machine, the plate of glass which is to be cut is supported upon a pliable disk or cylinder of soft rubber 88, similar to the cylinders or wheels 8 in form and function.

The cylinder 88 is fastened to and rotatable with a horizontal shaft 89, corresponding in function to the shaft 9, and which is the driven shaft of a speed reducing gear unit 90, of usual construction, which rests on a base 91, and which is connected to the armature shaft 92 of an electric motor 93, also mounted on the base 91. The motor and speed reducing gear unit, coupled together as shown, are such as are commonly sold on the market as power units for use where slow speed is desired to be obtained from a high speed electric motor.

Fastened to the casing of the unit 90 parallel with the shaft 89 is a stud 94, on which is pivoted one end of an oscillatable member comprising a lever 95, which extends over the shaft 89 and which has an arm comprising a lateral extension 96 in which is fastened an end portion of a pin 97 to the lower end of which is attached a glass cutter 98, corresponding in structure and function to the cutter 24, which moves in an arc intersecting the periphery of the glass plate supporting cylinder 88, and which is adapted to have traveling engagement with the plate of glass at the time resting on the cylinder 88.

As shown in Figs. 4 and 5, the cutter 24 is disposed between the wheels or cylinders 8 which support the glass plate to be cut.

Longitudinally adjustable on the lever or oscillatable member 95 is a tubular weight 99 having adjustable therein a set screw 100 adapted to bear against the lever 99 for holding the weight in its adjusted position.

In the operation of the form, shown in Figs. 17 and 18, the armature shaft 92 through the gear unit 90 revolves the shaft 89, and with it the cylinder 88 in a counter-clockwise direction, as viewed in Fig. 17.

The operator may use both hands in guiding the lens or other piece of glass which rests on the cylinder 88, the weight 99 serving as a means apart from the cutter carrying means, the lever 95, arm 96 and pin 97, for normally forcing the cutter 98 with proper pressure upon the piece of glass, which the cylinder 88 by frictional action feeds forwardly.

In the form shown in Figs. 1, 2, 4 and 13, the adjustable weight 86 serves as one means apart from the cutter carrying means, the members 26, 27, 33, 34 and 35, for normally forcing the cutter carrying means to its operative position with the cutter 24 in pressing engagement with the piece of glass at the time resting on the cylinders or wheels 8.

As will be noted in Fig. 3, the cutters 24 and 48, when in operative position, are disposed in the same vertical plane and transversely alined oppositely to each other, whereby they will, in operation and the piece of glass is fed between them, make two parallel cuts transversely opposite to each other in opposite sides respectively of the piece of glass, which is by a separate operation afterwards broken apart along said two cuts.

The spring plate 37 serves also as a means apart from the cutter carrying means, the members 26, 27, 33, 34 and 35, in connection with the members 40, 41 and 42, for normally forcing the cutter carrying means to the operative position, with the cutter 24 in pressing engagement with the piece of glass at the time supported on the cylinders or wheels 8.

In the form shown in Figs. 1 to 16, the lower car or carrier, the trucks of which run on the angle irons 1 of the top frame, may, by releasing the screw 86', be lifted and bodily removed, with the upper car having the platform 75, from the machine.

On releasing the screw 61, the carrier supporting the vacuum cups 63 or 68 may be lifted and removed from the angle irons 7.

Other modifications, within the scope of the appended claims, may be made without departing from the spirit of my invention.

What I claim is:—

1. In a glass cutting mechanism, a support, glass cutting means thereon, a carrier reciprocative on said support toward and from said cutting means, and glass supporting means reciprocative on said carrier transversely to the line of travel thereof.

2. In a glass cutting mechanism, a support, a carrier reciprocative on said support, glass supporting means reciprocative on said carrier transversely to the line of travel thereof, a cylinder revoluble on an axis parallel with said line of travel and adapted to support a piece of glass carried by said glass supporting means, a glass cutter, and means carrying said cutter movable to and from a position in which said cutter will have pressing cutting engagement with the piece of glass at the time resting on said cylinder.

3. In a glass cutting mechanism, a support, a carrier reciprocative on said support, glass supporting means reciprocative on said carrier transversely to the line of travel thereof, two glass cutters, and means for moving said cutters to two positions respectively at opposite sides of a piece of glass carried by said glass supporting means in which said cutters will make two parallel cuts transversely opposite to each other in said sides.

4. In a glass cutting mechanism, a support, glass cutting means thereon, a carrier rectilinearly reciprocative on said support toward and from said cutting means, glass supporting means revoluble on said carrier on an axis perpendicular to the line of travel of said carrier and adapted to support and revolve a piece of glass to be cut by said cutting means, and means for bringing said glass cutting means into traveling cutting engagement with the piece of glass at the time supported by said glass supporting means.

5. In a glass cutting mechanism, a support, a cylinder adapted to support and feed a piece of glass to be cut, means revolubly supporting said cylinder upon said support, a glass cutter, means carrying said cutter oscillative on said support to and from a position in which the cutter will have traveling cutting engagement with the piece of glass at the time resting on said cylinder, a carrier reciprocative on said support toward and from said cutter parallel with the axis of said cylinder, and means on said carrier adapted to support the piece of glass while the latter is supported by said cylinder.

6. In a glass cutting mechanism, a support, a cylinder having a peripheral frictional surface adapted to support a lens or other piece of glass to be cut, means for revolubly supporting said cylinder upon said support so as to forwardly feed the piece of glass, a glass cutter, a member pivoted to normally freely swing on said support on an axis parallel with the axis of said cylinder and having an arm carrying said cutter in a position in which said cutter moves in an arc intersecting the periphery of said cylinder and is adapted to have traveling engagement with the piece of glass at the time supported on the periphery of said cylinder, and means normally swinging said member to its operative position.

7. In a glass cutting mechanism, a support, a cylinder having a peripheral frictional surface adapted to support and forwardly feed a lens or other piece of glass to be cut, means for revolving said cylinder on said support, a glass cutter, and a member pivoted on said support and having a weighted extension at an angle to and at one side only of its axis and having an arm carrying said cutter in a position in which said cutter is adapted for pressing engagement with the piece of glass which at the time is supported on the periphery of said cylinder.

8. In a glass cutting mechanism, a support, a cylinder having a peripheral frictional surface adapted to support and forwardly feed a piece of glass to be cut, a glass cutter, means revolubly supporting said cylinder on said support, a member oscillatable on said support and having an arm carrying said cutter in a position in which said cutter is adapted to have traveling pressing engagement with the piece of glass at the time supported on the periphery of said cylinder, said member having an extension, and a weight adjustable on said extension toward and from the axis of said member.

9. In a glass cutting mechanism, a support, two parallel shafts one oscillatable and the other revoluble on said support, the oscillatable shaft having a lateral extension carrying a weight and having an arm, means for revolving the revoluble shaft, a cylinder carried by and revoluble with said revoluble shaft, and a cutter carried by said arm in a position in which it is adapted for traveling pressing engagement with a piece of glass to be cut and at the time supported and forwardly fed by the periphery of said cylinder.

MICHAEL B. KENDIS.